United States Patent [19]

Daenen et al.

[11] Patent Number: 4,609,237
[45] Date of Patent: Sep. 2, 1986

[54] DUAL LEVEL GRID ASSEMBLY FOR A CONTAINER

[75] Inventors: Robert H. C. M. Daenen, Hekelgem; Victor J. J. Cautereels, Borsbeek, both of Belgium

[73] Assignee: Dart Industries Inc., Northbrook, Ill.

[21] Appl. No.: 625,950

[22] Filed: Jun. 29, 1984

[51] Int. Cl.⁴ .............................................. A47B 96/00
[52] U.S. Cl. .................................... 312/351; 248/439; 294/144; 294/169; 294/172
[58] Field of Search ................... 108/12, 18, 19; 248/434, 168, 439, 558; 220/23.83, 23.86; 206/557; 294/144, 169, 172; 312/351

[56] References Cited

U.S. PATENT DOCUMENTS

| | | |
|---|---|---|
| D. 50,818 | 5/1917 | Miller . |
| D. 189,148 | 11/1960 | Wille ........................................ D44/1 |
| D. 239,692 | 4/1976 | Ashton ..................................... D7/130 |
| D. 273,214 | 3/1984 | Argandona ............................ D21/121 |
| 462,076 | 10/1891 | Devoll . |
| 2,503,795 | 4/1950 | Brown ...................................... 99/426 |
| 2,663,391 | 12/1953 | Kuhns ...................................... 294/142 |
| 3,392,845 | 7/1968 | Shapiro et al. ......................... 210/470 |
| 3,698,783 | 10/1972 | Swett et al. ............................ 312/351 |
| 3,846,320 | 11/1974 | Edwards ................................. 210/471 |
| 3,915,532 | 10/1975 | Ashton ................................... 312/351 |
| 4,013,202 | 3/1977 | Russo ..................................... 294/169 |
| 4,249,464 | 2/1981 | Hansen .................................... 99/450 |

*Primary Examiner*—William E. Lyddane
*Assistant Examiner*—Joseph Falk
*Attorney, Agent, or Firm*—John A. Doninger

[57] ABSTRACT

A food storage and preparation device including a container assembly and a grid assembly. The grid assembly includes a tray and handle arrangement which is pivotable between a first position wherein the tray is adjacent the base of the container and a second position wherein the tray is positioned above the base forming a dual level arrangement with space for foodstuffs below and above the tray. The device further includes a detent arrangement for maintaining the handles in the first and second positions.

18 Claims, 11 Drawing Figures

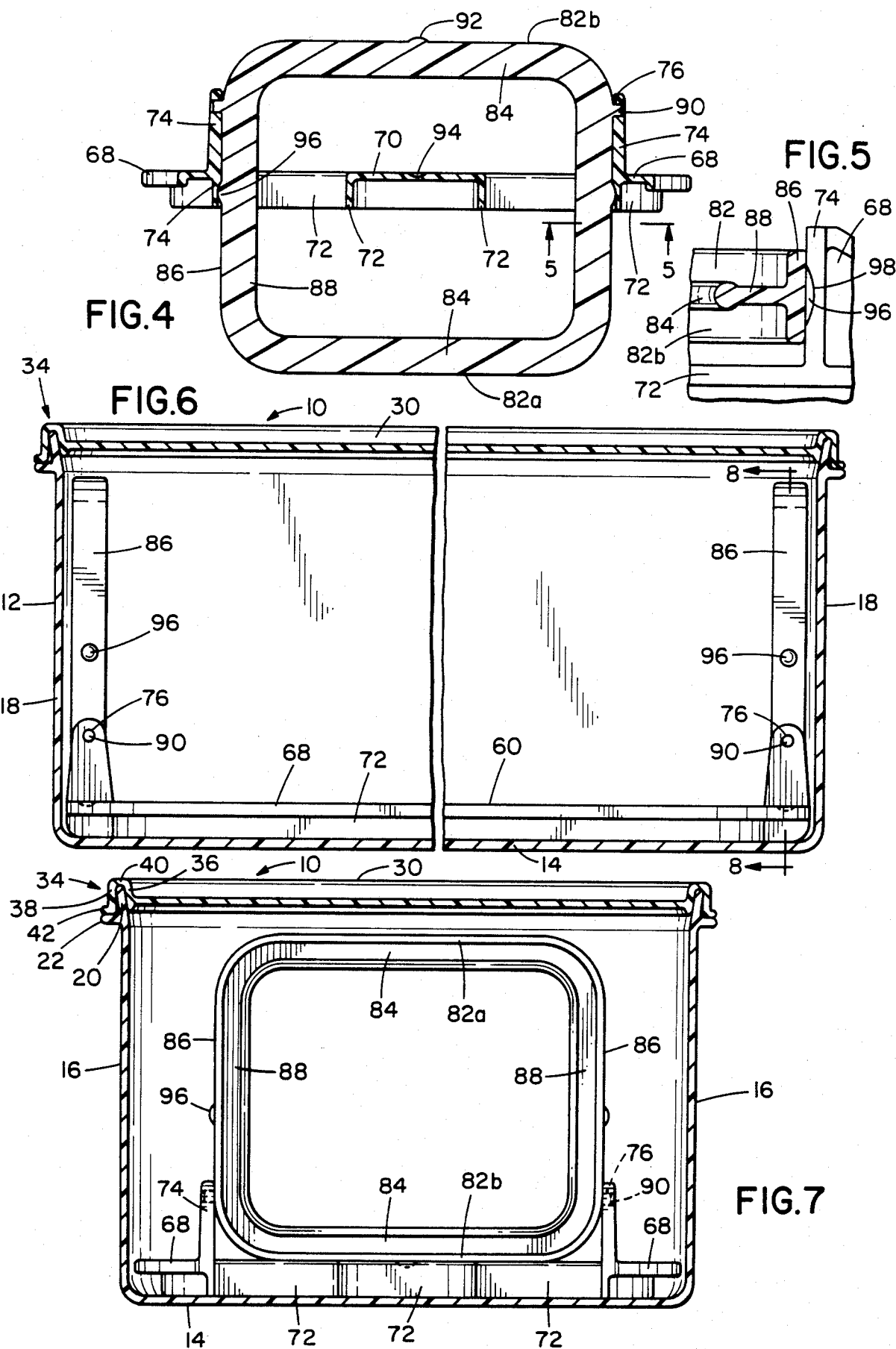

DUAL LEVEL GRID ASSEMBLY FOR A CONTAINER

This invention relates generally to a multi-use grid assembly for use in a receptacle for foodstuffs. More particularly, the invention relates to a container assembly with a removable dual level grid assembly adapted for the preparation and storage of various foodstuffs such as fruits, vegetables, meat, fish or the like.

It is known that various foodstuffs such as vegetables are best stored after being rinsed and cleaned. It is also known that the upper portion of a container sometimes goes unutilized since it is impractical to stack the foodstuffs on top of one another. In some cases soft fruits such as peaches can be damaged by such stacking.

It is therefore an object of this invention to provide a dual level grid assembly for a receptacle for use in the storage and preparation of various foodstuffs.

It is another object of this invention to provide a grid assembly for a receptacle having conveniently positioned handles to facilitate removal of the grid assembly from a container.

It is a further object of this invention to provide a grid assembly for a hermetically sealable receptacle having handles pivotable between a first position wherein the tray is located on the receptacle base and a second position wherein the grid is located intermediate the base and sealing rim of the receptacle.

These and other objects and advantages of the invention will become more apparent from the following detailed description of a preferred embodiment of the invention, the appended claims and the accompanying drawings. In the drawings:

FIG. 4 is a cross-section view of the grid assembly taken along line 4—4 of FIG. 2 with the container assembly removed for clarity.

FIG. 5 is a cross-section view taken along line 5—5 of FIG. 4.

FIG. 6 is a side elevation view of the grid assembly with the tray in the low level position with the container assembly shown in cross-section.

FIG. 7 is an end elevation view of the grid assembly shown in FIG. 6 with the container assembly shown in cross-section.

Figure 1:
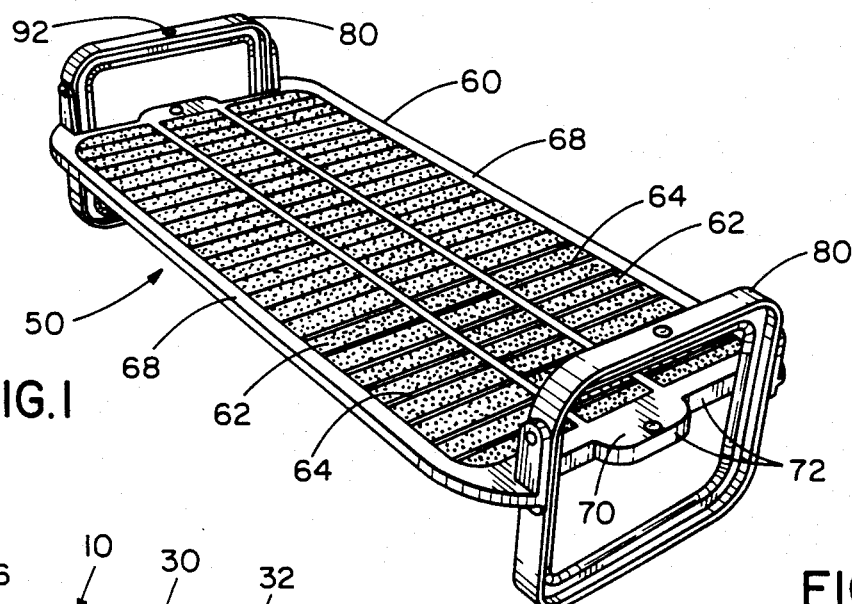
FIG. 1 is a top perspective view of the grid assembly with the tray at the mid-level position.

Referring to the drawings and in particular to FIGS. 2, 3, 6 and 7 the container assembly 10 includes a receptacle 12 and a cover 30. In the preferred embodiment shown, the receptacle 12 is generally rectangular and includes a base 14 with side walls 16 and end walls 18 extending upwardly therefrom. The side walls 16 and the end walls 18 terminate in an open upper end defined by a sealing rim 20. Extending outwardly from the side walls and end walls is a stiffening and handling flange 22.

The closure or cover 30 includes a central wall portion 32 having a sealing member 34 extending about the periphery thereof. The sealing member 34 includes a first or inner section 36, a second or outer section 38 connected at one end by a third or top section 40 to form a generally U-shaped groove. The sealing member 34 fits over the sealing rim 20 such that an airtight seal is created between the cover 30 and the receptacle 12. A lip 42 extends outwardly from the outer section 38 of the sealing member 34 to facilitate installation and removal of the closure 30.

Figure 10:
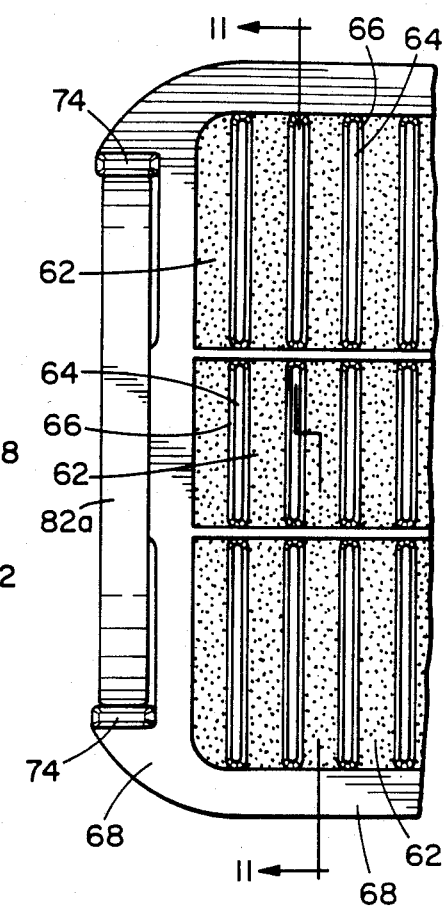
FIG. 10 is a fragmentary top plan view of one end of the grid assembly.

The grid assembly 50 comprises a tray 60 and a pair of oppositely positioned handles 80. As can best be seen in FIGS. 1 and 10 the tray 60 includes a central rack portion 62 which includes a plurality of drain slots 64. The drain slots 64 are defined by downwardly angling edges 66. The tray 60 is defined at its outer periphery by peripheral side ledges 68 and peripheral end ledges 70 which extend outwardly from the central rack portion in cantilever fashion. A pair of support arms 74 extend upwardly from each end of the tray at the termination of the peripheral side ledge. Thus each pair of support arms 74 form support means, the purpose of which will be explained later. In the preferred embodiment disclosed the support arms 74 are generally rectangular in cross-section and include a pivot hole 76 proximate the upper portion. The support arms 74 also extend downwardly from the underside of the tray and include an indented portion 98. Also extending downwardly from the underside of the tray are a plurality of reinforcing ribs 72 which form tray support means to provide strength to the tray and supports for the central rack portion 62.

Figure 9:
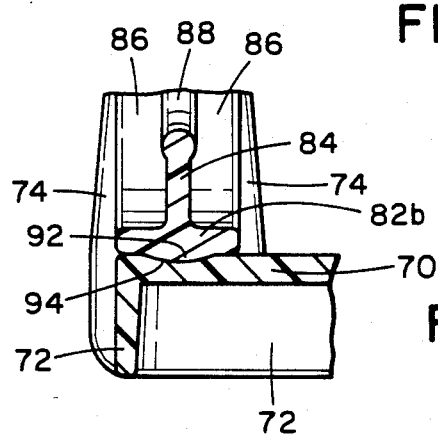
FIG. 9 is a cross-section view taken along line 9—9 of FIG. 8.

In the preferred embodiment the handles 80 are generally rectangular and comprised of oppositely positioned finger-grippable horizontal portions 82a and 82b. The finger-grippable horizontal portions 82a and 82b are connected via curved corner portions to oppositely positioned vertical leg portions 86. As best shown in FIG. 5, each vertical leg portion 86 is generally rectangular in cross-section with a reinforcing rib 88 extending inwardly therefrom. The pivot pins 90 are adapted to mate with the corresponding pivot apertures 76 in the support arms 74 to form pivot means. As shown in FIG. 9, the horizontal portions 82a and 82b are generally rectangular in cross-section with a reinforcing rib 84 extending perpendicularly inwardly therefrom.

On the finger-grippable horizontal portion 82b there is a protrusion 92 which cooperates with an indented portion 94 on the end ledge 70 to form a first position detent means. On each of the vertical leg portions 86 there is a protrusion 96 which cooperates with an indented portion 98 on the support arm 74 to form a second position detent means. The purpose of each detent means 92,94 and 96,98 will be explained later.

Figure 11:
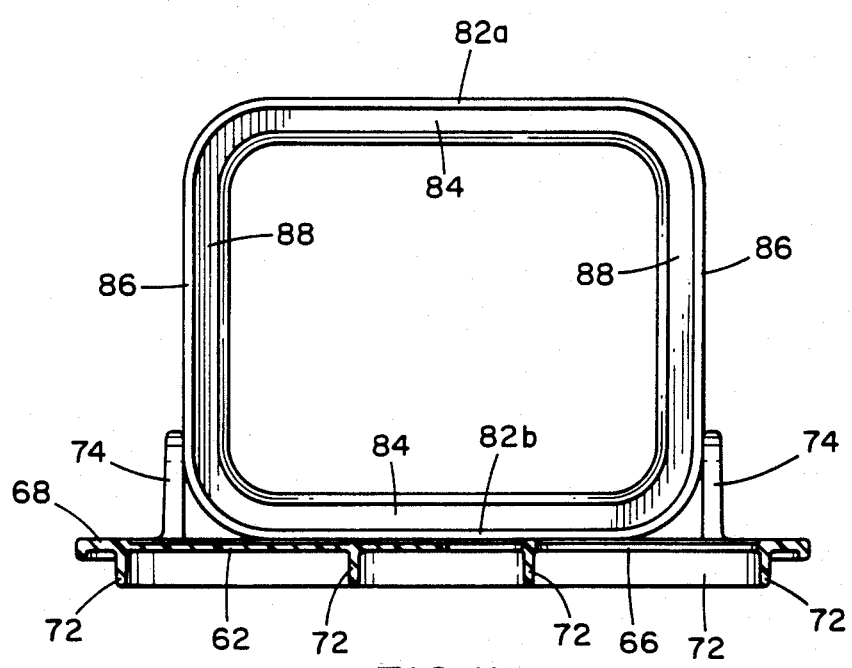
FIG. 11 is a cross-section view of the grid assembly taken along line 11—11 of FIG. 10.

As can best be seen in FIGS. 2, 3, 4 and 7, the tray handles 86 are pivotable between two positions. In one of the positions, shown in FIG. 6, the tray 60 is located on the base 14 of the receptacle 12 providing maximum storage space above the tray. In this position a container-space is located entirely above the tray. As can best be seen in FIG. 11 the central rack portion is carried above the container base 14 by the ribs 72 thus providing a space in which liquid can accumulate. In this position any foodstuffs on the tray 60 in the receptacle 12 will be held out of contact with the base 14 and thus out of contact with any moisture accumulated thereon. As best shown in FIGS. 6 and 7, in this position of the tray the finger-grippable horizontal portions 82a of each handle are positioned adjacent the sealing rim 20 of the receptacle 12. Thus it is possible to easily grasp the finger-grippable horizontal portions 82a of the handles 80 to lift the grid assembly 50 out of the receptacle 12.

Figure 8:
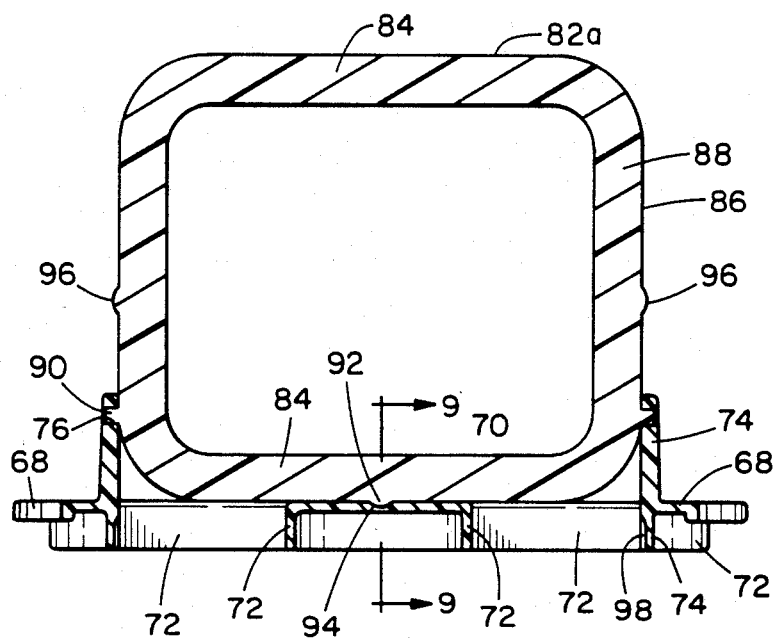
FIG. 8 is a cross-section view taken along line 8—8 of FIG. 6 with the container assembly removed for clarity.

As can best be seen in FIGS. 8 and 9, the oppositely positioned horizontal portion 82b is positioned in close proximity to the end ledge 70. The protrusion 92 on the horizontal portion 82b and the indented portion 94 cooperate to form a detent means which maintains the handles 80 in a substantially vertical position. Slight flexure of the cantilevered end ledge as the handle 80 is rotated into position allows the protrusion 92 to nest in the indented portion 94. This is especially advantageous when the tray 60 is placed on a counter top or other support surface. It should be noted that when the grid assembly 50 is placed in the receptacle 12 each handle 80 is adjacent to the end wall 18 such that rotation of the handle is prevented by engagement with the end wall 18. Thus the handles 80 will remain in a substantially vertical position even if the detent means is disengaged.

Figure 2:
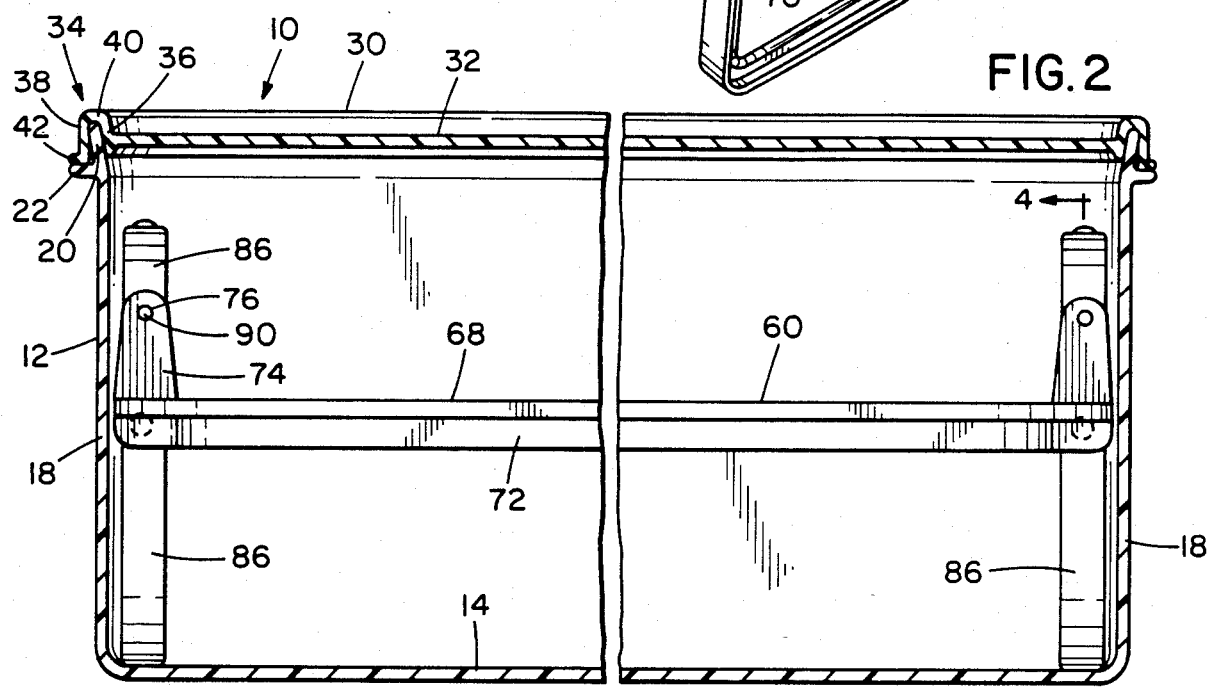
FIG. 2 is a side elevation view of the grid assembly with the tray at the mid-level position and the container assembly shown in cross-section.
Figure 3:
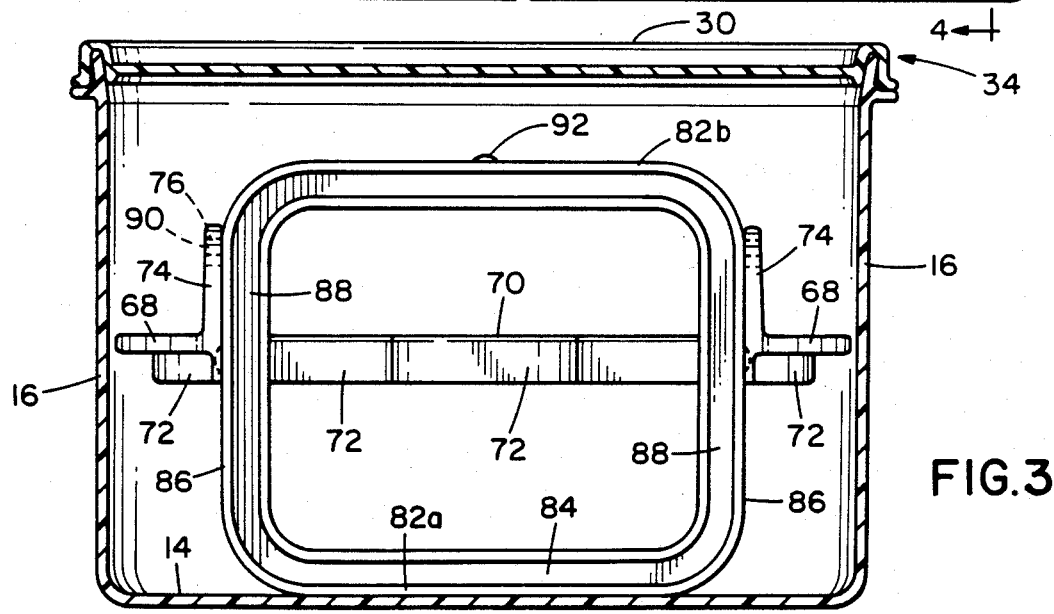
FIG. 3 is an end elevation view of the grid assembly shown in FIG. 2 with the container assembly shown in cross-section.

As best shown in FIGS. 2 and 3, the handles 80 are pivotable from the position shown in FIGS. 6 and 7, to a position wherein the tray 60 is located above the base 14 approximately midway between the base 14 and the sealing rim 20. In this position the tray 60 is supported on the vertical leg portions 86 and the finger-grippable horizontal portion 82a engages the base 14. This creates a dual level storage receptacle wherein items can be stored in the space below the tray 60 as well as on the tray 60. In this configuration the container assembly 10 and grid assembly 50 can be utilized for poaching foodstuffs such as fish wherein the steam from the liquid simmering rises to cook the foodstuffs positioned on the tray 60. The drain slots 64 in the tray 60 allow the steam to rise and surround the foodstuffs. The finger-grippable horizontal portion 82b of each handle 80 is positioned adjacent the sealing rim 20 of the receptacle 12 so that the grid assembly 50 can be easily lifted out of the receptacle 12.

As can best be seen in FIGS. 4 and 5, the protrusions 96 on the vertical leg portions 86 coact with the indented portions 98 on the support arms 74 to form a detent which maintains the handles 80 in a substantially vertical position. Slight flexure of the portion of the support arms 14 which includes the indentations 98 as the handle 80 is rotated into position allows each of the protrusions 96 to nest in the adjacent indented portion 98. As previously mentioned, this is especially advantageous when the tray 60 is placed on a counter top or other support surface. It should also be noted that in the preferred embodiment lateral stability is provided to the grid assembly 50 since the vertical leg portions 86 are positioned in very close proximity to the support arms 74 along the entire extent thereof. When the grid assembly 50 is positioned in the receptacle 12 each handle 80 is adjacent the end wall 18 such that rotation of the handle 80 is prevented by engagement with the end wall 18. Thus, the handles 80 will remain in a substantially vertical position even if the detent means disengaged.

It should be understood that while a preferred embodiment of the invention has been disclosed, modifications and alterations may be made by those skilled in the art without departing from the spirit and scope of the invention as defined in the claims appended hereto.

We claim:

1. A food storage and preparation device comprising:
   a receptacle having a base and oppositely positioned side walls and end walls terminating in a sealing rim;
   a cover for said receptacle, said cover including a peripheral sealing member adapted to mate with said sealing rim;
   a tray removably positionable in said receptacle;
   tray support means extending downwardly from said tray;
   support arms on said tray;
   a pair of handles, said handles each including a pair of oppositely positioned finger-grippable portions;
   pivot means on said handles and support arms for pivotally attaching said handles to said support arms;
   said handles being pivotable on said support arms between a first position wherein one of said finger-grippable portions is adjacent said sealing rim and a second position wherein the other of said finger-grippable portions is adjacent said sealing rim thereby facilitating insertion and removal of the tray from said receptacle;
   said tray support means in said first position of said handles being positioned on the base thereby creating a container-space located entirely above the tray; and
   said tray support means in said second position of said handles being positioned intermediate said base and said sealing rim thereby creating a container-space located above and below the tray.

2. A food storage and preparation device according to claim 1 wherein each of said handles includes a pair of oppositely positioned leg portions which connect said oppositely positioned finger-grippable portions to one another.

3. A food storage and preparation device according to claim 2 wherein said support arms extend upwardly or downwardly from said tray in spaced pairs for supporting each of said handles.

4. A food storage and preparation device according to claim 3 wherein said pivot means comprises a pivot pin positioned on each of said handle leg portions and an aperture in each of said support arms.

5. A food storage and preparation device according to claim 4 wherein said handles and said tray include first and second detent means to maintain said handles in said first and second positions respectively.

6. A food storage and preparation device according to claim 5 wherein at least one of said finger-grippable portions has a protrusion thereon and said tray has at least one indentation therein, said protrusion and said indentation coacting to form said first detent means.

7. A food storage and preparation device according to claim 6 wherein at least one of said leg portions has a protrusion thereon and at least one of said support arms has an indentation therein, said protrusion and said indentation coacting to form said second detent means.

8. A food storage and preparation device according to claim 6 wherein said tray comprises a central rack portion defined at its outer periphery by oppositely positioned peripheral side ledges and oppositely positioned peripheral end ledges and said tray support means comprise a plurality of reinforcing ribs extending downwardly from said central rack portion.

9. A food storage and preparation device according to claim 8 wherein said at least one indentation is positioned in said end ledge.

10. In a food storage and preparation device including a receptacle having a base and oppositely positioned side walls and end walls terminating in a sealing rim, a cover for said receptacle, said cover including a peripheral sealing member adapted to mate with said sealing rim, the improvement comprising:

a tray removably positionable in said receptacle; support arms on said tray;

a pair of handles, said handles each including a pair of oppositely positioned finger-grippable portions;

pivot means on said handles and support arms for pivotally attaching said handles to said support arms;

said handles being pivotable on said support arms between a first position wherein one of said finger-grippable portions is adjacent said sealing rim and a second position wherein the other of said finger-grippable portions is adjacent said sealing rim thereby facilitating insertion and removal of the tray from said receptacle;

said tray in said first position of said handles being positioned proximate the base thereby creating a container-space located entirely above the tray; and said tray in said second position of said handles being positioned intermediate said oppositely positioned finger-grippable portions thereby creating a container-space located above and below the tray.

11. A food storage and preparation device according to claim 10 wherein each of said handles includes a pair of oppositely positioned leg portions which connect said oppositely positioned finger-grippable portions to one another.

12. A food storage and preparation device according to claim 11 wherein said support arms extend upwardly or downwardly from said tray in spaced pairs for supporting each of said handles.

13. A food storage and preparation device according to claim 12 wherein said pivot means comprises a pivot pin positioned on each of said handle leg portions and an aperture in each of said support arms.

14. A food storage and preparation device according to claim 13 wherein said handles and said tray include first and second detent means to maintain said handles in said first and secon positions respectively.

15. A food storage and preparation device according to claim 14 wherein at least one of said finger-grippable portions has a protrusion thereon and said tray has at least one indentation therein, said protrusion and said indentation coacting to form said first detent means.

16. A food storage and preparation device according to claim 15 wherein at least one of said leg portions has a protrusion thereon and at least one of said support arms has an indentation therein, said protrusion and said indentation coacting to form said second detent means.

17. A food storage and preparation device according to claim 10 wherein said tray includes tray support means extending downwardly therefrom.

18. A food storage and prepration device according to claim 17 wherein said tray support means comprises a plurality of reinforcing ribs.

* * * * *